(12) United States Patent
Carmack et al.

(10) Patent No.: US 10,173,777 B1
(45) Date of Patent: *Jan. 8, 2019

(54) USING MULTIROTOR LIFTERS TO RENDEZVOUS WITH FIXED WING AIRCRAFT

(71) Applicant: Amazon Technologies, Inc., Seattle, WA (US)

(72) Inventors: Scott Gerard Carmack, Mercer Island, WA (US); Narasimha Rao Lakkakula, Bothell, WA (US); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,209

(22) Filed: Mar. 16, 2017

Related U.S. Application Data

(63) Continuation of application No. 14/863,025, filed on Sep. 23, 2015, now Pat. No. 9,630,712.

(51) Int. Cl.
| | | |
|---|---|---|
| *B64C 39/00* | (2006.01) | |
| *B64C 27/08* | (2006.01) | |
| *B64C 11/00* | (2006.01) | |
| *B64D 5/00* | (2006.01) | |
| *G05D 1/00* | (2006.01) | |
| *B64C 39/02* | (2006.01) | |

(52) U.S. Cl.
CPC .............. *B64D 5/00* (2013.01); *B64C 11/00* (2013.01); *B64C 27/08* (2013.01); *B64C 39/022* (2013.01); *B64C 39/024* (2013.01); *G05D 1/0011* (2013.01); *B64C 2201/021* (2013.01); *B64C 2201/024* (2013.01); *B64C 2201/104* (2013.01); *B64C 2201/108* (2013.01); *B64C 2201/12* (2013.01); *B64C 2201/165* (2013.01); *B64C 2201/206* (2013.01)

(58) Field of Classification Search
CPC ..... B64C 39/00; B64C 39/022; B64C 39/024; B64C 2201/021; B64C 2201/024; B64C 2201/12; B64C 2201/148; B64C 27/08; B64C 27/12; B64C 27/22; B64C 27/52; B64D 5/00

See application file for complete search history.

(56) References Cited

U.S. PATENT DOCUMENTS

| | | | |
|---|---|---|---|
| 9,376,208 B1 | 6/2016 | Gentry | |
| 9,630,712 B1 * | 4/2017 | Carmack | ............... B64C 39/024 |
| 9,764,829 B1 * | 9/2017 | Beckman | ................ B64C 27/22 |
| 2014/0277854 A1 | 9/2014 | Jones et al. | |
| 2016/0083073 A1 | 3/2016 | Beckman | |
| 2016/0083115 A1 | 3/2016 | Hess | |

(Continued)

*Primary Examiner* — Yonel Beaulieu
(74) *Attorney, Agent, or Firm* — Athorus, PLLC

(57) ABSTRACT

This disclosure describes systems and processes using multirotor lifter to deploy and/or engage fixed wing aircraft. For example, one or more unmanned multirotor lifters may engage an unmanned fixed wing aircraft, aerially navigate the fixed wing aircraft vertically to a desired altitude, and then release the fixed wing aircraft so that the fixed wing aircraft can initiate a flight plan. In some implementations, multirotor lifter may also be configured to engage fixed wing aircraft while both the multirotor lifters and the fixed wing aircraft are in flight.

21 Claims, 9 Drawing Sheets

(56) References Cited

U.S. PATENT DOCUMENTS

2016/0137293 A1    5/2016   Santangelo
2016/0152321 A1    6/2016   Lupashin et al.
2016/0179096 A1    6/2016   Bradlow et al.

* cited by examiner

USING MULTIROTOR LIFTERS TO RENDEZVOUS WITH FIXED WING AIRCRAFT

CROSS-REFERENCE TO RELATED APPLICATION

This application is a continuation of and claims priority to U.S. application Ser. No. 14/863,025, filed Sep. 23, 2015, now U.S. Pat. No. 9,630,712, entitled "Using Multirotor Lifters to Deploy Fixed Wing Aircraft," which is incorporated herein by reference in its entirety.

BACKGROUND

Multirotor aircrafts (e.g., quad-copters, octo-copters) and unmanned fixed wing aircraft are becoming more common. Each have their positives and negatives. For example, multirotor aircraft are agile and employ a vertical landing and takeoff. However, they are often limited by carrying capacity and flight duration due to the power supplies being utilized. In comparison, fixed wing aircraft, even using similar power supplies, can travel much farther distances as they are more efficiently designed for horizontal flight. However, fixed wing aircraft require a larger area for takeoff and landing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
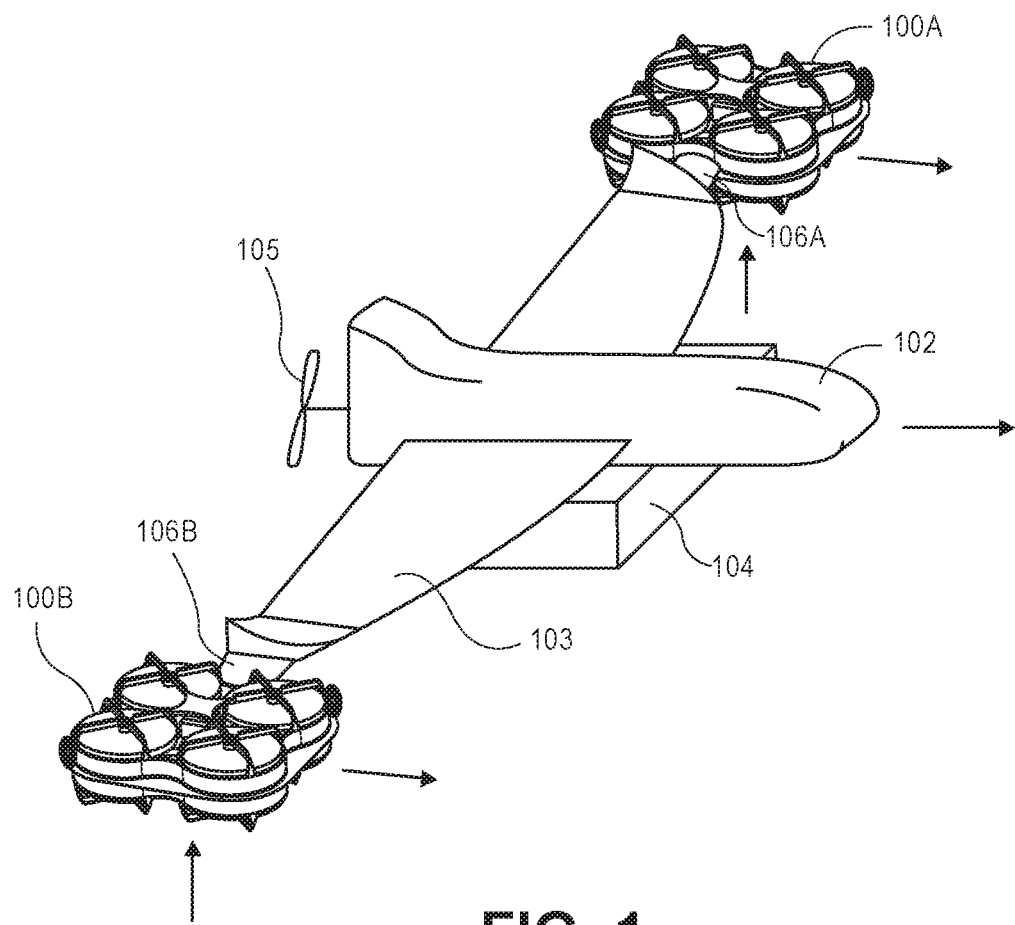
FIG. 1 depicts a view of a fixed wing aircraft being aerially positioned for deployment by two multirotor lifters, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent or temporary, direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes systems and processes using one or more multirotor lifting mechanisms (i.e, multirotor "lifters") to deploy and/or engage fixed wing aircraft. For example, one or more unmanned multirotor lifters may engage an unmanned fixed wing aircraft, aerially navigate the fixed wing aircraft vertically to a desired altitude, and then release the fixed wing aircraft so it can initiate a flight plan. Using multirotor lifters to aerially navigate fixed wing aircraft to a desired altitude and then release the fixed wing aircraft provides an environment in which the fixed wing aircraft can effectively takeoff without the need for a large horizontal space on the ground so that the fixed wing can reach a minimal speed necessary for flight. Likewise, using multirotor lifters that release the fixed wing aircraft eliminates the additional weight from motors, controls, etc., that would otherwise be required by a fixed wing aircraft to facilitate a vertical takeoff.

In some implementations, multirotor lifters may also be configured to engage fixed wing aircraft while both the multirotor lifters and the fixed wing aircraft are in flight, so that the multirotor lifters can take control of the flight of the fixed wing aircraft and enable a vertical descent and landing of the fixed wing aircraft. In some implementations, rather than descending with an engaged fixed wing aircraft, the multirotor lifters may be configured to attach a payload and/or replace power modules of the fixed wing aircraft after it is engaged and while both the fixed wing aircraft and the multirotor lifters are airborne.

FIG. 1 depicts a view of a fixed wing aircraft 102 being aerially positioned for deployment by two multirotor lifters 100A, 100B, according to an implementation. The fixed wing aircraft 102 may by any type of fixed wing aircraft that includes at least one fixed wing 103 designed to provide lift to the fixed wing aircraft 102 when the fixed wing aircraft 102 is flying in a direction that includes a horizontal component. In some implementations, the fixed wing aircraft 102 may also include a thrusting motor (not shown) and corresponding thrusting propeller 105, collectively referred to herein as a thrusting propulsion mechanism. Likewise, the fixed wing aircraft may include a control system, such as the control system 900 illustrated and discussed below with respect to FIG. 9.

The fixed wing aircraft may be lightweight, made of any number and/or types of materials, and configured to extended flight duration. Likewise, while the example illustrated in FIG. 1 shows a single thrusting propulsion mechanism, in other implementations, the fixed wing aircraft 102 may not include any thrusting propulsion mechanism, or may include additional thrusting propulsion mechanisms. In addition, alternative methods of propulsion may be utilized in implementations described herein. For example, fans, jets, turbojets, turbo fans, jet engines, internal combustion engines, and the like may be used (either with propellers or other devices) to generate thrust for the fixed wing aircraft 102.

The fixed wing aircraft 102 may also include a power module (not shown). The power module for the fixed wing aircraft may be in the form of battery power, solar power, gas power, super capacitor, fuel cell, alternative power generation source, or a combination thereof. In some implementations, one or more of the power modules may be configured such that it can be autonomously removed and/or replaced with another power module while the fixed wing aircraft is landed or in flight. In implementations in which the fixed wing aircraft does not include a propulsion mechanism, the power module may be utilized to power the control system of the fixed wing aircraft and/or the attachment component, discussed below, that is used to attach and/or detach a payload and/or the power module.

In some implementations, the fixed wing aircraft 102 may also be configured to carry a payload 104, such as an item ordered by a user from an electronic commerce website for aerial delivery to a user selected delivery destination. In some implementations, as illustrated and discussed below with respect to FIG. 5, the payload 104 may include a multirotor lifters that is configured to complete a delivery of an item to a delivery destination.

Figure 2:
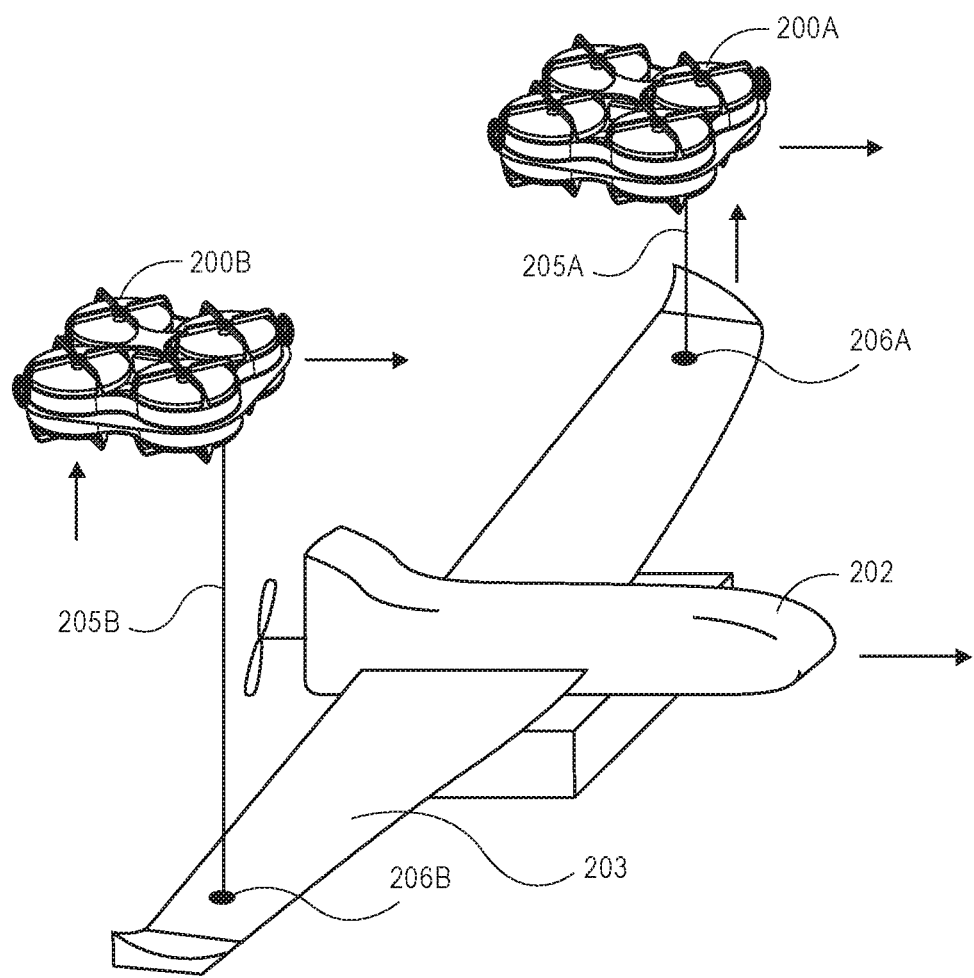
FIG. 2 depicts another view of a fixed wing aircraft being aerially positioned for deployment by two multirotor lifters, according to an implementation.
Figure 3:
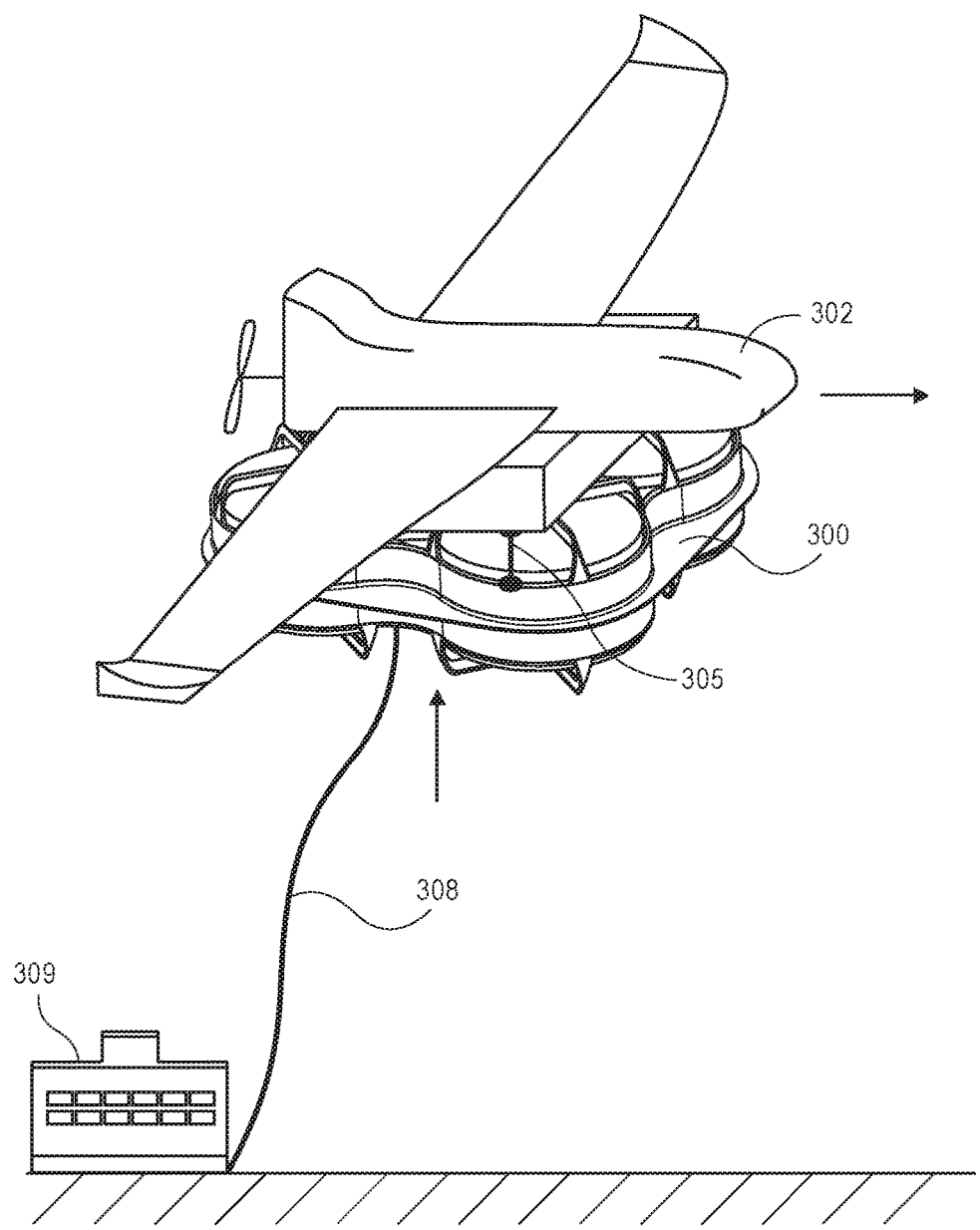
FIG. 3 depicts a view of a fixed wing aircraft being aerially positioned for deployment by a tethered multirotor lifter, according to an implementation.

As discussed below, the fixed wing aircraft may also include one or more engagement receivers 106A, 106B that are configured to receive an engagement mechanism of a multirotor lifter 100A, 100B. The engagement receives may be any type of configuration to enable coupling and decoupling of the fixed wing aircraft 102 with one or more multirotor lifters 100. Depending on the configuration, the fixed wing aircraft 102 may include one or more engagement receivers positioned at any variety of locations. For example, while FIG. 1 illustrates two engagement receivers 106A, 106B positioned at the ends or tips of each fixed wing 103, in other implementations, the engagement receivers may be positioned on the top of the wings, as illustrated in FIG. 2, underneath the fixed wing aircraft, as illustrated in FIG. 3, etc.

The engagement receivers may be, for example, magnets, electromagnets, openings, and/or bars that can be grasped by an engagement mechanism, holes, or receptors into which an engagement mechanism may be positioned, etc. In some implementations, the engagement receivers 106 may be configured to rotate or pivot such that the fixed wing aircraft 102 can be maintained at a desired pitch while the multirotor lifters are positioned at a different pitch. For example, in some implementations, the multirotor lifters may aerially lift the fixed wing aircraft in a substantially vertical direction to a desired altitude and then fly in a direction that includes a horizontal component to aid in increasing the horizontal speed of the fixed wing aircraft so that the fixed wing aircraft can maintain flight through lift generated by the fixed wings 103. In such an implementation, the multirotor lifters 100A, 100B may pitch forward to enable flight by the multirotor lifters in a direction that includes a horizontal component. In comparison, the fixed wing aircraft may be kept approximately horizontal and/or pitched upward to generate lift resulting from the air passing over the fixed wings as the fixed wing aircraft moves in a direction that includes a horizontal component.

In some implementations, the fixed wing aircraft 102 may include one or more antennas (not shown) that may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System (GPS) receiver/transmitter, radars, illumination elements, speakers, and/or any other component of the fixed wing aircraft 102 or the control system (discussed below), etc., may likewise be included on the fixed wing aircraft 102. Likewise, identification or reflective identifiers may be mounted to the fixed wing aircraft 102 to aid in the identification and/or visual tracking of the fixed wing aircraft 102.

The multirotor lifter 100, such as multirotor lifters 100A, 100B, may be any type of multirotor lifting mechanism and have any number of lifting motors and/or lifting propellers, generally referred to herein as lifting propulsion mechanisms, or propulsion mechanisms. While the illustration of FIG. 1 shows the propulsion mechanisms as lifting motors and corresponding lifting propellers, alternative methods of propulsion may be utilized as the propulsion mechanisms. For example, fans, jets, turbojets, turbo fans, jet engines, internal combustion engines, and the like may be used (either with propellers or other devices) to provide lift for the multirotor lifters.

The propulsion mechanisms collectively generate sufficient lift to aerially navigate the multirotor lifter and at least a portion of the fixed wing aircraft 102 in a substantially vertical direction. For example, as illustrated in FIG. 1, each of the multirotor lifters 100A, 100B is configured such that the propulsion mechanisms can aerially lift in a substantially vertical direction the multirotor lifter and at least half of the fixed wing aircraft 102 so that together the two multirotor lifters 100A, 100B can aerially lift in a substantially vertical direction the fixed wing aircraft 102 to a desired altitude.

The multirotor lifter 100 may also include a power module (not shown). The power module for the multirotor lifter may be in the form of battery power, solar power, gas power, super capacitor, fuel cell, alternative power generation source, or a combination thereof. In some implementations, one or more of the power modules may be configured such that it can be autonomously removed and/or replaced with another power module while the multirotor lifter is landed or in flight. In some implementations, as discussed below with respect to FIG. 3, power to the multirotor lifter 100 may be provided from a remote source through a tether.

In some implementations, the frame of the multirotor lifter 100 may be formed of a single mold or uni-body design. In other implementations, one or more components of the frame may be coupled together. In some implementations, the frame may be formed as two matching halves that are mounted or coupled together to form a single multirotor lifter frame for the multirotor lifter. To further improve the efficiency of the multirotor lifter, in some implementations, the frame (motor arms, motor mount, support arms, perimeter protection barrier) and/or other components of the multirotor lifter may be formed of one or more lightweight materials, such as carbon fiber, graphite, machined aluminum, titanium, fiberglass, etc. Regardless of the material, each of the motor arms, motor mounts, support arms, and/or perimeter protection barrier may be hollow or formed around a lightweight core (e.g., foam, wood, plastic), thereby reducing weight, increasing structural rigidity and providing a channel through which one or more wires and/or cables may be passed and/or in which other components may be housed. For example, the motor arms may include both an inner core (e.g., foam, wood, plastic) and a hollow portion. The inner core, which may be formed of foam, wood, plastic, etc., or any combination thereof, provides increased dimensionality to the motor arm and helps increase the structural integrity of the motor arm. The hollow portion, which may run along the top of the motor arm, provides a channel through which wires, such as motor control wires, may be passed.

In some implementations, the multirotor lifter may include one or more antennas (not shown) that may be used to transmit and/or receive wireless communications. For example, the antennas may be utilized for Wi-Fi, satellite, NFC, cellular communication, or any other form of wireless communication. Other components, such as cameras, time of flight sensors, distance determining elements, gimbals, GPS receiver/transmitter, radars, illumination elements, speakers, and/or any other component of the multirotor lifter 100 or the control system (discussed below), etc., may likewise be included on the multirotor lifter 100. Likewise, identification or reflective identifiers may be mounted to multirotor lifters 100 to aid in the identification and/or visual tracking of the multirotor lifters 100. Likewise, the multirotor lifters 100 may include a control system, such as the control system 900 illustrated and discussed below with respect to FIG. 9.

The multirotor lifter 100 also includes one or more engagement mechanisms configured to selectively engage and/or disengage the engagement receiver of the fixed wing aircraft 102. The engagement mechanism may be of any form such as an electromagnet, magnet, bar or other rigid member that may be positioned within an engagement receiver, clasp or gripping mechanism, mechanical motor configured to move a gripping mechanism between an open and a closed position, etc. In some implementations, the multirotor lifter 100 may include different types of engagement mechanisms to enable engagement with different types of engagement receivers of different fixed wing aircrafts. Likewise, the different engagement mechanisms may be positioned at different locations on the multirotor lifter 100 to enable engagement with engagement receivers at different positions on fixed wing aircrafts 102.

For example, an electromagnet engagement mechanism may be positioned on an upper or top surface of the multirotor lifter such that the multirotor lifter can engage with a metal engagement receiver positioned on an underneath or bottom portion of a fixed wing aircraft, as illustrated in FIG. 3. Likewise, the multirotor lifter 100 may include a mechanically driven engagement mechanism positioned on a side of the multirotor lifter that is configured to grasp an engagement receiver positioned on an end or tip of a wing of a fixed wing aircraft, as illustrated in FIG. 1. As another example, the multirotor lifter may include an engagement mechanism positioned on an underneath or bottom side of the multirotor lifter 100 that is configured to engage an engagement receiver positioned on an upper or top of a fixed wing aircraft, as illustrated in FIG. 2. As will be appreciated, any number and/or type of engagement mechanisms may be positioned on the multirotor lifter 100.

In the example illustrated in FIG. 1, the multirotor lifters 100A, 100B are engaged with the fixed wing aircraft 102. This may be done while the multirotor lifters 100 and the fixed wing aircraft are landed, such as during attachment of the payload 104 at a materials handling facility, or while the multirotor lifters 100A, 100B and the fixed wing aircraft 102 are in flight.

When the multirotor lifters 100A, 100B are engaged with the fixed wing aircraft 102, the lifting propulsion mechanisms of the multirotor lifters are engaged and aerially lift the multirotor lifters 100A, 100B and the fixed wing aircraft 102 in a substantially vertical direction to a determined altitude. The determined altitude may be any altitude. In some implementations, the determined altitude may be based on wind speed, planned heading and/or flight path of the fixed wing aircraft, size of the fixed wing aircraft, weight of the fixed wing aircraft, configuration of the fixed wing aircraft, etc. For example, in some implementations, the determined altitude may be at a height sufficient to enable the fixed wing aircraft to obtain a minimum speed necessary to sustain flight without aid from the multirotor lifter once detached from the multirotor lifters 100.

In some implementations, when the multirotor lifter 100A, 100B reach the determined altitude with the fixed wing aircraft 102, the multirotor lifters 100A, 100B may orient the fixed wing aircraft in a determined heading. The determined heading may be based on the wind speed, wind direction, planned flight path, etc. For example, in some implementations, the multirotor lifter may orient the fixed wing aircraft 102 such that it has a heading into the wind.

When the fixed wing aircraft is at the determined altitude and determined orientation, the multirotor lifters 100A, 100B may decouple from the fixed wing aircraft 102. Likewise, the thrusting propulsion mechanism of the fixed wing aircraft 102 may be engaged, if included, to initiate a horizontal movement of the fixed wing aircraft 102. When decoupled, the fixed wing aircraft may initially descend from the determined altitude as it gains speed due to the forces of gravity and the thrusting propulsion mechanism until lift from the fixed wings is sufficient such that the fixed wing aircraft is able to maintain flight without the aid of the multirotor lifters 100.

By vertically lifting the fixed wing aircraft to a determined altitude using multirotor lifters and then decoupling the multirotor lifters from the fixed wing aircraft such that the fixed wing aircraft can maintain flight without the aid of the multirotor lifters enables vertical deployment of fixed wing aircraft without the added weight and power requirements being included on the fixed wing aircraft.

FIG. 2 depicts another view of a fixed wing aircraft 202 being aerially positioned for deployment by two multirotor lifters 200A, 200B, according to an implementation. As with FIG. 1, the examples discussed herein may include any type and/or configuration of fixed wing aircraft 202 and/or any type, number, or configuration of multirotor lifter 200A, 200B. For example, rather than including two multirotor lifters 200A, 200B that engage and lift the fixed wing aircraft, in another implementation, a single multirotor lifter may couple to an engagement receiver of the fixed wing aircraft that is at an approximate center of gravity of the fixed wing aircraft or couple with multiple engagement receivers. In other implementations, more than two multirotor lifters may engage with engagement receivers of the fixed wing aircraft.

In the example illustrated in FIG. 2, the multirotor lifters 200A, 200B include engagement mechanisms 205A, 205B positioned on a lower or underneath side of the multirotor lifter 200A, 200B that extend down from the multirotor lifter 200A, 200B and engage with engagement receivers 206A, 206B positioned on an upper or top side of each fixed wing 203 of the fixed wing aircraft 202. As with the example discussed above with respect to FIG. 1, the engagement mechanisms 205 and/or engagement receivers 206 may be of any type and/or configuration.

In this example, the engagement mechanisms 205A, 205B extend so that there is a distance between the multirotor lifters 200A, 200B and the fixed wing aircraft to reduce or eliminate any forces generated from air passing through the lifting propulsion mechanisms of the multirotor lifters 200A, 200B negatively impacting the fixed wing aircraft 202. In some implementations, the engagement mechanisms 205A, 205B may provide a separation of between five and ten feet between the multirotor lifter 200A, 200B and the fixed wing aircraft 202.

Similar to the discussion presented above with respect to FIG. 1, the multirotor lifters 200A, 200B aerially lift the fixed wing aircraft 202 in a substantially vertical direction of a determined altitude and orient the fixed wing aircraft 202 in a determined orientation. Once the fixed wing aircraft 202 has been lifted to the determined altitude and positioned according to the determined orientation, the engagement mechanisms 205A, 205B may disengage from the engagement receivers 206A, 206B such that the fixed wing aircraft 202 can initiate a flight path that includes a horizontal component. Likewise, the fixed wing aircraft 202 may engage a thrusting propulsion mechanism.

In some implementations, the multirotor lifter 200A, 200B may also move the fixed wing aircraft 202 in a horizontal direction to increase the horizontal speed of the fixed wing aircraft prior to disengaging from the fixed wing aircraft. In such an implementation, the engagement mechanism and/or the engagement receiver may include an adjustment component such that the multirotor lifters can pitch forward to enable horizontal flight while the fixed wing aircraft maintains a horizontal or upward pitch.

FIG. 3 depicts a view of a fixed wing aircraft 302 being aerially positioned for deployment by a tethered multirotor lifter 300, according to an implementation. In this example, the multirotor lifter 300 includes an engagement mechanism 305 positioned on the upper or top side of the multirotor lifter 300 that engages with an engagement receiver (not shown) on an underneath or bottom side of the fixed wing aircraft 302. Like the other examples, any type, number, and/or position of engagement receiver(s) and/or engagement mechanism(s) may be utilized.

In this example, the multirotor lifter 300 is coupled to a tether 308. The tether may be coupled to a ground station 309. The tether may be used to retain the multirotor lifter, provide communication between the multirotor lifter 300 and the ground station 309, and/or provide power to the multirotor lifter 300. For example, the ground station 309 may include one or more computing resources that communicate with the multirotor lifter and/or the fixed wing aircraft. When the multirotor lifter is tethered, the communication between the computing resources and the multirotor lifter may be wired, using the tether.

The computing resources, which may be local to the ground station 309, remote from the ground station 309, or a combination thereof, may form a portion of a network-accessible computing platform implemented as a computing infrastructure of processors, storage, software, data access, and other components that is maintained and accessible via a network, such as a wireless or wired network (e.g., the Internet). The computing resources may include one or more servers. The servers may be arranged in any number of ways, such as server farms, stacks, and the like. Services offered and/or processes performed by the computing resources do not require end user knowledge of the physical location and configuration of the computing resources that deliver the services. Common expressions associated with distributed computing resources include "on-demand computing," "software as a service (SaaS)," "platform computing," "network-accessible platform," "cloud-based platform," "cloud computing" and or other similar terms.

The computing resources may be any form of computing resources and include one or more processors and memory. The memory (and each memory described herein) may include non-transitory computer-readable storage media ("CRSM"), which may be any available physical media accessible by a processor to execute instructions stored on the memory. In one basic implementation, non-transitory CRSM may include random access memory ("RAM") and Flash memory. In other implementations, non-transitory CRSM may include, but is not limited to, read-only memory ("ROM"), electrically erasable programmable read-only memory ("EEPROM"), or any other medium which can be used to store the desired information and which can be accessed by one or more processors.

The multirotor lifter 300 engages with the fixed wing aircraft 302, aerially lifts the fixed wing aircraft 302 in a substantially vertical direction to a determined altitude, and orients the fixed wing aircraft according to a determined orientation. When the fixed wing aircraft is at the determined altitude and oriented according to the determined orientation, the multirotor lifter disengages the fixed wing aircraft so that the fixed wing aircraft can initiate a flight plan. Like the other examples, in some implementations, the multirotor lifter may begin flight in a horizontal direction prior to disengaging the fixed wing aircraft 302. In such an implementation, the engagement mechanism and/or engagement receiver may be configured such that the multirotor lifter can pitch without altering the pitch of the fixed wing aircraft. Alternatively, the multirotor lifter may also include one or more thrusting propulsion mechanisms that may be used to enable flight in a horizontal direction.

In some implementations, the multirotor lifter, in addition or as an alternative to engaging a fixed wing aircraft, lifting it to a determined altitude and disengaging the fixed wing aircraft, may be configured to engage a fixed wing aircraft that is airborne. For example, a fixed wing aircraft may be completing a flight plan and the multirotor lifter may aerially navigate to a position of the fixed wing aircraft and engage the fixed wing aircraft, using the engagement mechanism(s) as the fixed wing aircraft completes the flight plan and while the fixed wing aircraft is airborne.

Upon engagement by the multirotor lifter, the multirotor lifter may assume control of keeping the fixed wing aircraft airborne and vertically descend with the fixed wing aircraft, thereby providing the ability to vertically land the fixed wing aircraft. Alternatively, or in addition thereto, upon engagement and assuming control of flight, the multirotor lifter may be configured to attach a payload to the fixed wing aircraft, attach and/or replace power modules of the fixed wing aircraft, and then disengage the fixed wing aircraft so that the fixed wing aircraft can initiate another flight plan, such as delivering the newly attached payload to a destination.

Figure 4:
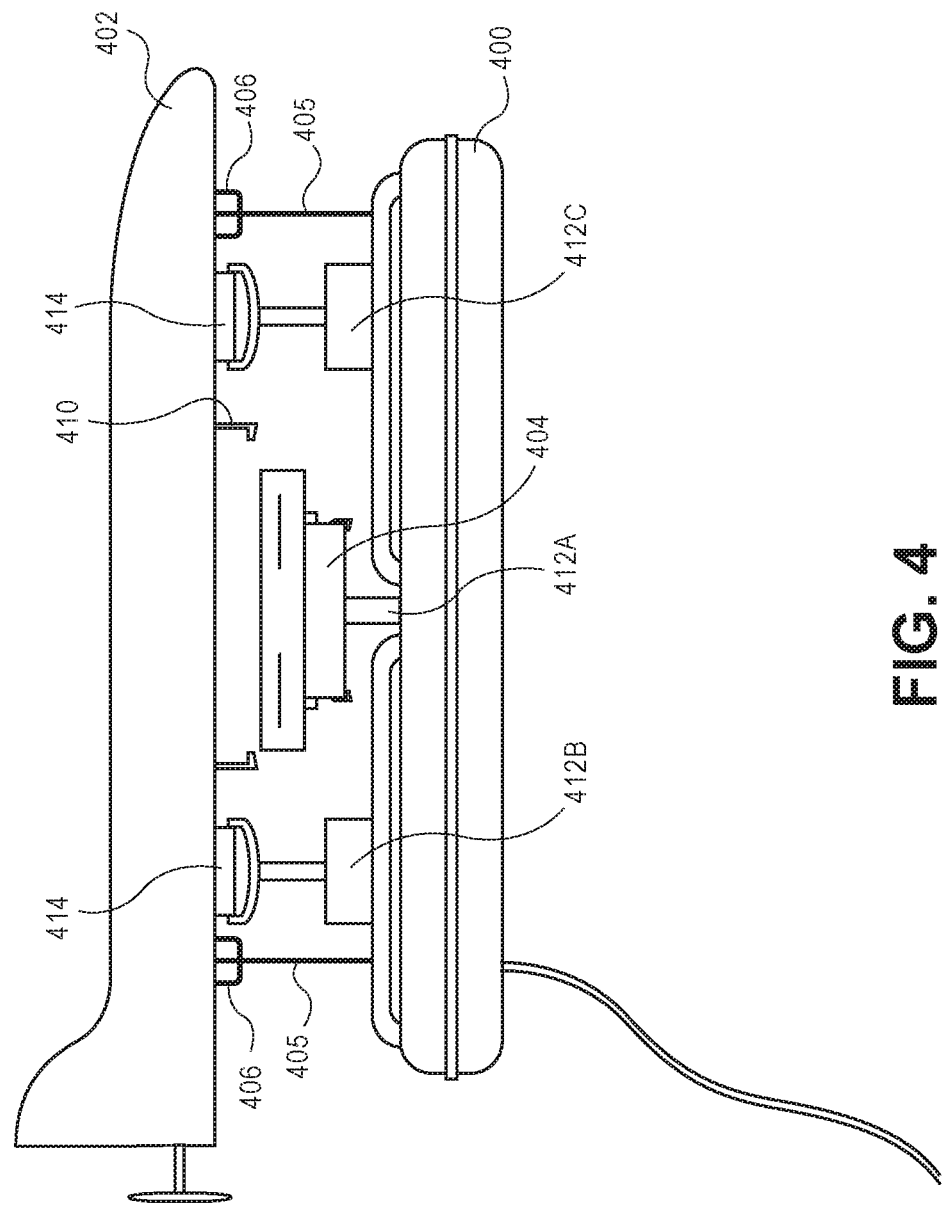
FIG. 4 depicts a side view of a fixed wing aircraft engaged by a multirotor lifter, according to an implementation.

FIG. 4 depicts a side view of a fixed wing aircraft 402 engaged by a multirotor lifter 400, according to an implementation. As illustrated, the multirotor lifter 400 engages the fixed wing aircraft 402 using engagement mechanisms 405 that engage with engagement receivers 406 of the fixed wing aircraft 402. Upon engagement, the multirotor lifter assumes control of keeping the multirotor lifter 400 and the fixed wing aircraft airborne. Likewise, in this implementation, the multirotor lifters includes attachment mechanisms 412 that are configured to attach and/or detach components, such as a payload 404 and/or power modules 414 to the fixed wing aircraft while the fixed wing aircraft and the multirotor lifter remain airborne.

For example, the attachment mechanism 412A may be configured to lift a payload 404 into place so that it is engaged by a payload engagement mechanism 410 of the fixed wing aircraft 402. Likewise, if the fixed wing aircraft 402 already included a payload, the attachment mechanism 412A may be configured to remove the payload from the fixed wing aircraft 402. Likewise, the attachment mechanisms 412B, 412C may be configured to attached and/or remove power modules from the fixed wing aircraft 402. Likewise, if a depleted power module 414 is removed from the fixed wing aircraft, in some implementations, the multirotor lifter may receive the depleted power module and charge the power module. In such an implementation, after the payload 404 has been attached to the fixed wing aircraft and the power modules 414 replaced, the multirotor lifter may disengage the fixed wing aircraft so that the fixed wing aircraft can initiate a new flight plan.

Figure 5:
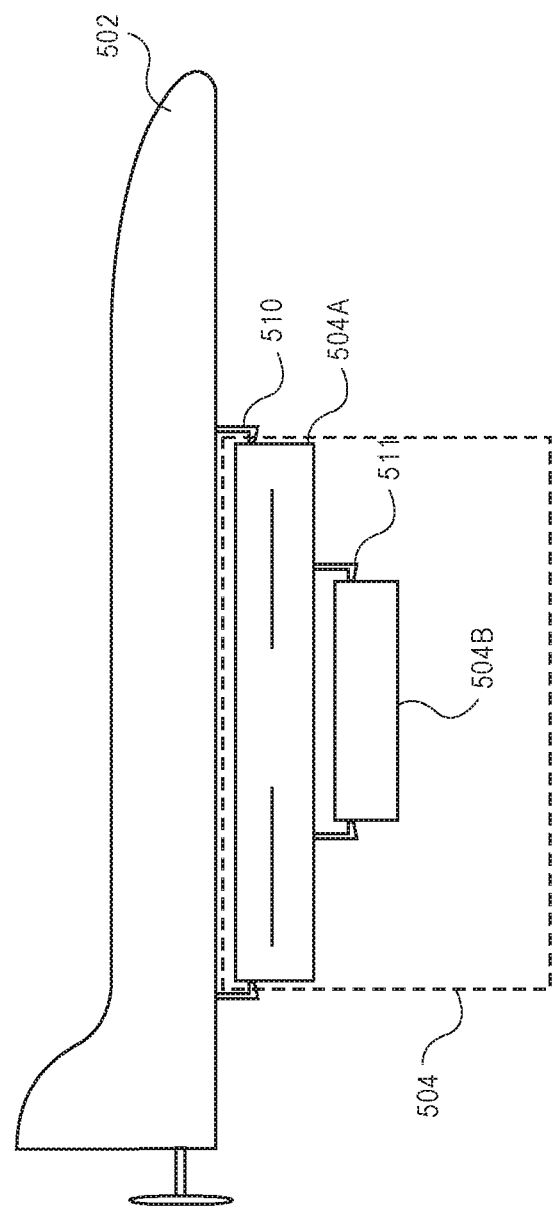
FIG. 5 depicts a side view of a fixed wing aircraft with a payload, according to an implementation.

FIG. 5 depicts a side view of a fixed wing aircraft 502 with a payload 504, according to an implementation. As illustrated, the payload may include multiple components. The payload may be in a container or an independent item. In another example, such as the one illustrated in FIG. 5, the payload 504 may include multiple components and one or more of those components of the payload 504 may detach from another component of the payload. For example, the payload 504 that is attached to the fixed wing aircraft 502 by the payload engagement mechanism 510 may include a package 504B for delivery to a delivery destination, and an unmanned aerial vehicle ("UAV") 504A that is secured to the package 504B and configured to complete a delivery of the package 504B to the delivery destination. For example, when the fixed wing aircraft 502 reaches a defined position in the flight plan, it may detach the payload 504. Once detached, the UAV 504A may engage one or more propulsion mechanisms to control a descent of the payload 504 to the delivery destination. In some implementations, the UAV may be configured such that it has sufficient power to control the direction and speed of descent of the payload 504 but insufficient power to stop the descent of the payload 504. However, once the package is delivered to the delivery destination and detached from the UAV, with the lighter weight, the UAV may have sufficient power to ascend and reattach to the fixed wing aircraft 502. Alternatively, the UAV 504A may be a low cost, or single use UAV that remains with the package 504B at the delivery destination. The user may either discard the UAV and/or cause the UAV to be transported back to a destination (e.g., by traditional mail) so that the UAV can be utilized for other item deliveries.

In still another example, the UAV 504A may have sufficient power to control the direction and speed of the descent of the payload 504 and/or terminate the descent of the payload. Likewise, when the package 504B has been released by the UAV 504A, the UAV may aerially navigate back to the fixed wing aircraft and/or aerially navigate to another destination, such as a defined landing area. At the landing area, the UAV may be retrieved by another device and reused for future deliveries.

In other implementations, other means or mechanisms may be utilized to complete a delivery of the payload 504 to a delivery destination. For example, the payload engagement mechanism may include a cable that lowers the payload 504 to the delivery destination, or a defined height above the delivery destination, and disengage the payload. In still another example, the fixed wing aircraft 502 may be able to descend to a defined distance above the delivery destination and release the payload.

Figure 6:
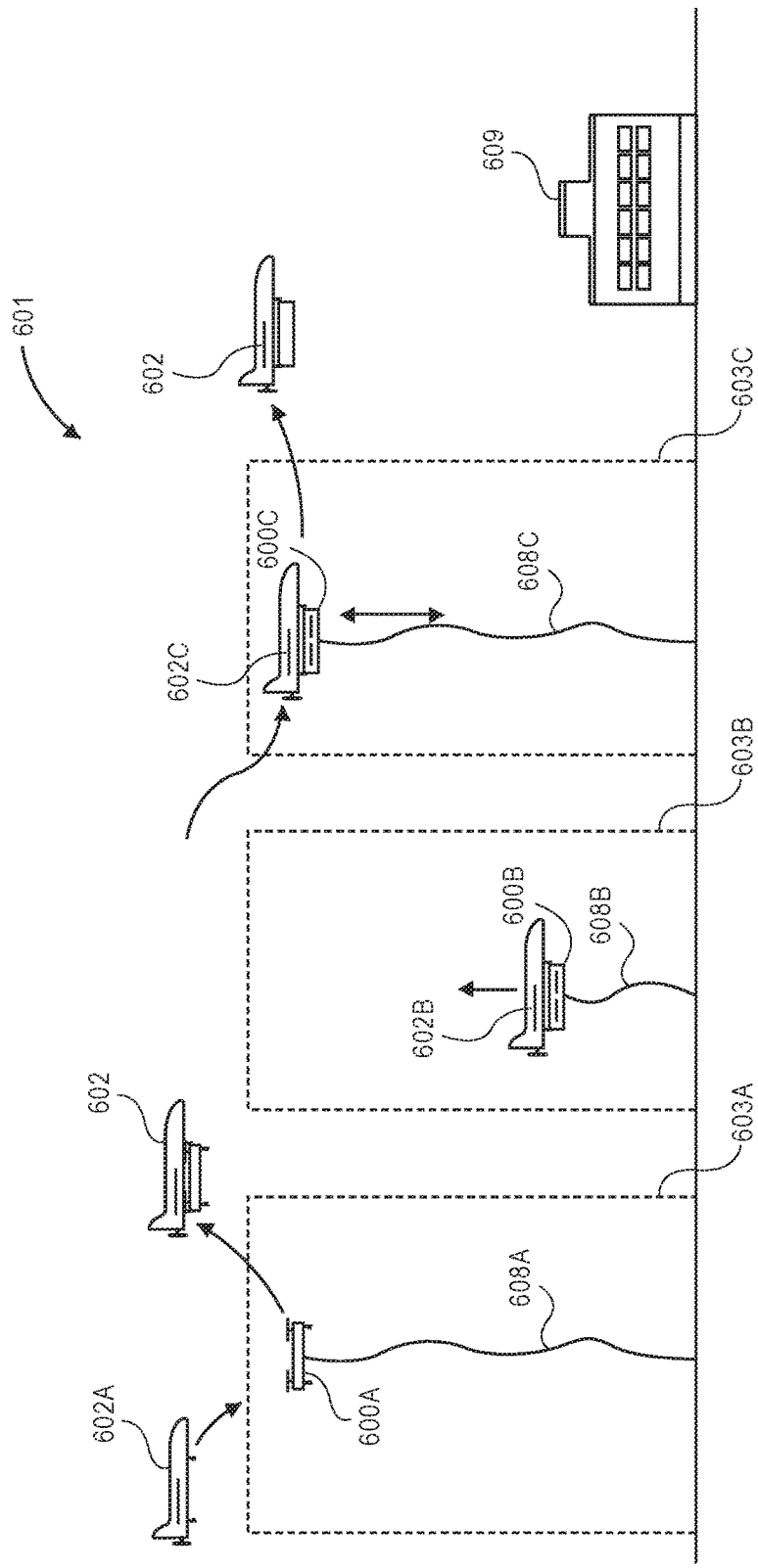
FIG. 6 depicts a view of an environment in which multirotor lifters are being used to disengage fixed wing aircraft for flight and/or to engage fixed wing aircraft at a flight completion, according to an implementation.

FIG. 6 depicts a view of an environment 601 in which multirotor lifter 600 are being used to disengage fixed wing aircraft 602 for flight and/or to engage fixed wing aircraft 602 at a flight completion, according to an implementation. In this example, multiple fixed wing aircraft 600A, 600B, 600C are operating to engage and disengage multiple fixed wing aircraft 602A, 602B, 602C. In this example, each multirotor lifter 600 is tethered with a tether 608A, 608B, 608C that provides power to the multirotor lifter 600 and communication between the multirotor lifter 600 and one or more computing resources of the ground station 609. Likewise, each multirotor lifter is configured to operate within a defined airspace 603A, 603B, 603C.

The computing resources communicate with the fixed wing aircraft 602 and the multirotor lifter to coordinate inbound aircraft engagement and outbound aircraft deployment. For example, the computing resources may communicate with fixed wing aircraft 602A and provide aircraft engagement position information indicating a position, such as within airspace 603A to which the fixed wing aircraft is to navigate for engagement by a multirotor lifter 600A. The aircraft engagement position information may indicate a flight pattern, altitude, heading, speed, etc., that the fixed wing aircraft is to follow until it is engaged by a multirotor lifter.

Likewise, the computing resources may send engagement instructions to the multirotor lifter 600A that instruct the multirotor lifter to aerially engage the fixed wing aircraft 600A. The engagement instructions may provide position, heading, orientation, etc. information for the fixed wing aircraft and an engagement point to which the multirotor lifter is to navigate to perform engagement with the fixed wing aircraft.

Figure 8:
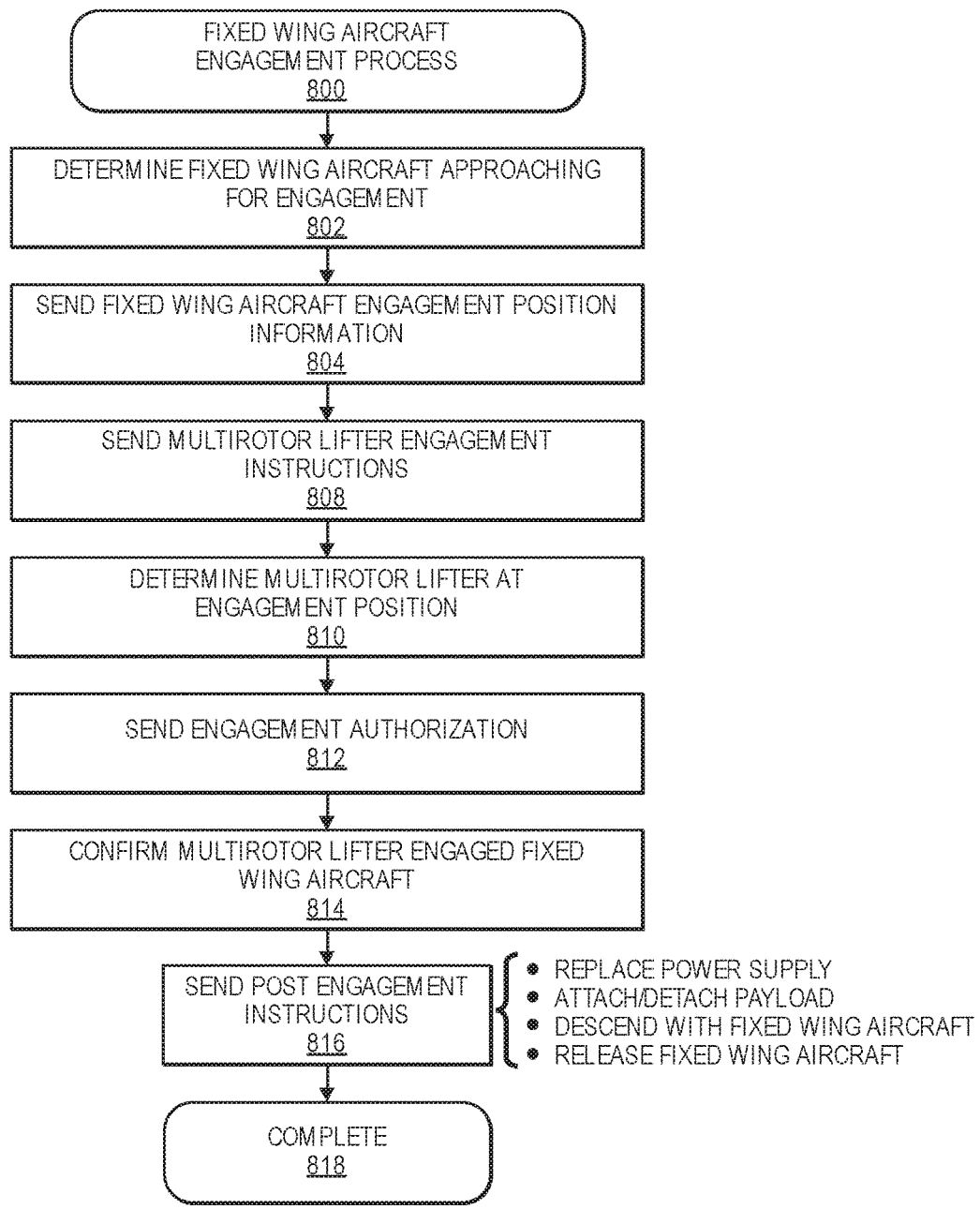
FIG. 8 illustrates a flow diagram of an example fixed wing aircraft engagement process, according to an implementation.

When the multirotor lifter reaches the engagement point it engages the fixed wing aircraft and assumes responsibility for maintaining flight of the fixed wing aircraft and the multirotor lifter. FIG. 8 provides additional details for an example process for engaging a fixed wing aircraft.

Figure 7:
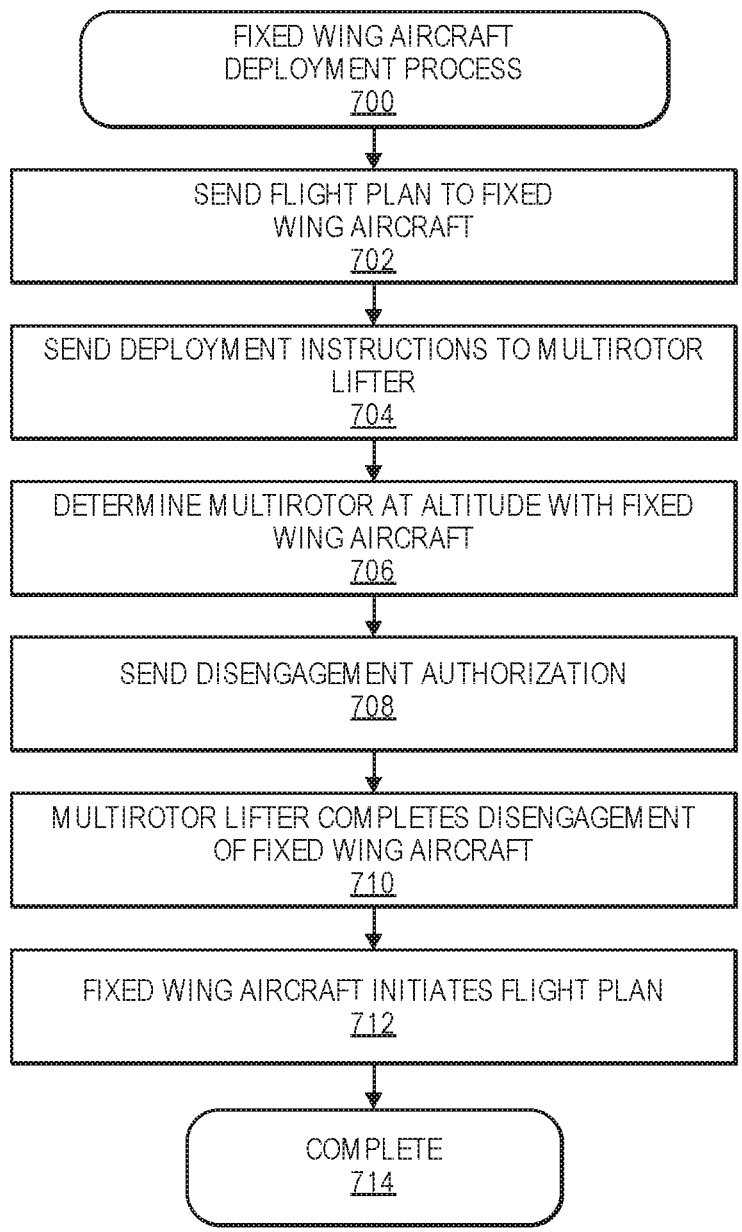
FIG. 7 illustrates a flow diagram of an example fixed wing aircraft deployment process, according to an implementation.

As another example, the control system may provide deployment instructions that indicate a determined altitude and determined heading for deployment of a fixed wing aircraft. For example, deployment instructions may be sent to multirotor lifter 600B and/or the fixed wing aircraft 602B that is engaged by the multirotor lifter. The multirotor lifter 600B will vertically lift the fixed wing aircraft 600B to the desired altitude and orient the fixed wing aircraft 602B according to the desired heading and then detach from the fixed wing aircraft 602B so that the fixed wing aircraft can initiate a flight path. FIG. 7 provides additional details for an example process for deploying a fixed wing aircraft.

The computing resources may also provide additional information or instructions to the fixed wing aircrafts and/or the multirotor lifters. For example, the computing resources may provide flight plans, weather information, payload configuration, and/or weight information to the fixed wing aircrafts. Likewise, the computing resources may provide engagement receiver positions, fixed wing aircraft configurations and/or weight information to the multirotor lifters and/or provide post-engagement action instructions to the multirotor lifter indicating additional actions that are to be performed with respect to a fixed wing aircraft after engagement (e.g., descend, attach payload, attach power modules).

FIG. 7 illustrates a flow diagram of an example fixed wing aircraft deployment process 700, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process may be performed after a multirotor lifter has engaged a fixed wing aircraft that is to be deployed. As discussed, the fixed wing aircraft may be engaged while on the ground or the fixed wing aircraft may be engaged while both the fixed wing aircraft and the multirotor lifter are airborne.

The example process 700 begins by sending a flight plan to a fixed wing aircraft that is to be deployed, as in 702. The flight plan may include destination information, a path to be followed by the fixed wing aircraft to the destination, altitudes, speed, etc. that are utilized by the fixed wing aircraft to aerially navigate to and/or from a destination, such as a delivery destination.

Deployment instructions are also sent to a multirotor lifter that is to deploy the fixed wing aircraft, as in 704. In some implementations, the deployment instructions may also be sent to the fixed wing aircraft. The deployment instructions indicate a determined altitude to which the multirotor lifter is to aerially lift the fixed wing aircraft prior to disengagement from the fixed wing aircraft.

A determination is then made that the multirotor lifter is at the determined altitude with the fixed wing aircraft, as in 706. It may be determined that the fixed wing aircraft is at the determined altitude by, for example, monitoring the altitude of the multirotor lifter and/or the fixed wing aircraft, by receiving a notification from the multirotor lifter and/or the fixed wing aircraft confirming that the determined altitude has been reached, etc.

Once it is determined that the determined altitude has been reached, a disengagement authorization is sent to the multirotor lifter and/or the fixed wing aircraft, as in 708. In some implementations, prior to sending a disengagement authorization, it may also be determined that the airspace around the fixed wing aircraft is void of other aircraft so that the fixed wing aircraft can be deployed without potential for impact.

The disengagement authorization authorizes the multirotor lifter to complete positioning of the fixed wing aircraft and disengage the fixed wing aircraft so that the fixed wing aircraft can initiate the flight plan, as in 710. In some implementations, upon receiving a disengagement authorization, final positioning and disengagement is performed autonomously by the multirotor lifter. For example, the multirotor lifter may utilize one or more sensors to determine a heading, based on wind speed and direction, in which the fixed wing aircraft should be oriented prior to disengagement. Likewise, the multirotor lifter may communicate directly with the fixed wing aircraft to provide the fixed wing aircraft with disengagement timing and a notification as to when the fixed wing aircraft is to initiate the thrusting propulsion mechanism and independent flight—i.e., flight without aid of the multirotor lifter.

Upon disengagement by the multirotor lifter of the fixed wing aircraft, the fixed wing aircraft initiates the flight plan, as in 712. As discussed above, because the fixed wing aircraft is at a determined altitude it will accelerate after detachment to a speed sufficient to maintain independent flight. The example process 700 then completes, as in 714.

FIG. 8 illustrates a flow diagram of an example fixed wing aircraft engagement process 800, according to an implementation. As discussed above, the multirotor lifters may be used to engage fixed wing aircrafts while the fixed wing aircrafts are in flight. The example process 800 begins by determining that a fixed wing aircraft is approaching for which engagement is to be performed, as in 802. In some implementations, flight plans of each fixed wing aircraft may be monitored and as a fixed wing aircraft approaches and is completing its flight plan, it may be determined that the fixed wing aircraft is approaching and is to be engaged by a multirotor lifter.

When a fixed wing aircraft that is to be engaged is determined, fixed wing aircraft engagement position information is provided to the fixed wing aircraft, as in 804. The engagement position information may indicate, for example, an airspace into which the fixed wing aircraft is to navigate, a heading, ground speed, air speed, altitude and/or path to follow until the fixed wing aircraft is engaged. Likewise, in some implementations, the fixed wing aircraft engagement position information may also identify a multirotor lifter that will engage the fixed wing aircraft and provide security information that is used to establish a secure communication between the fixed wing aircraft and the multirotor lifter.

As the fixed wing aircraft approaches an engagement area, multirotor lifter engagement instructions are sent to a multirotor lifter that is to engage the fixed wing aircraft while the fixed wing aircraft is in flight, as in 808. The multirotor lifter engagement instructions may indicate an engagement point at which the multirotor lifter is to engage the fixed wing aircraft, the heading, ground speed, air speed, altitude, and/or path that is to be followed by the fixed wing aircraft until engagement is complete, etc. Likewise, the instructions may identify the fixed wing aircraft and include security information that is utilized to verify the fixed wing aircraft and establish a secure communication with the fixed wing aircraft. In some implementations, the fixed wing aircraft may include visually unique identifiers (e.g., markers) that are detected by the multirotor lifter and used to verify the identity of the fixed wing aircraft. Likewise, the fixed wing aircraft may transmit an identifier that is received by the multirotor lifter and compared with identifiers associated with the visually unique identifier to confirm the identity of the fixed wing aircraft. Other verification techniques may likewise by utilized.

The example process 800 then determines that the multirotor lifter and the fixed wing aircraft are in the respective engagement positions, as in 810, and sends an engagement authorization, as in 812. The engagement authorization may be sent to the multirotor lifter and/or to the fixed wing aircraft. The engagement authorization indicates to the multirotor lifter and the fixed wing aircraft that they are authorized to complete engagement. In some implementations, the final engagement of the multirotor lifter and the fixed wing aircraft is performed autonomously between the multirotor lifter and the fixed wing aircraft. For example, the fixed wing aircraft may provide position information (e.g., heading, speed, altitude) to the multirotor lifter. The multirotor lifter may visually track the fixed wing aircraft and use the received position information to position itself and align the engagement mechanism(s) of the multirotor lifter with the engagement receivers. Once aligned, the multirotor lifter may provide a notification to the fixed wing aircraft indicating that engagement is to occur and engage the multirotor lifter. Likewise, the multirotor lifter, upon receiving the engagement notification from the multirotor lifter may confirm that engagement has occurred and may then power down its thrusting propulsion mechanisms so that flight of the fixed wing aircraft is controlled by the engagement multirotor lifter.

After engagement, the example process confirms that the engagement has completed, as in 814. Confirmation may be received from either the fixed wing aircraft, the multirotor lifter and/or visually determined. Upon confirming engagement between the multirotor lifter and the fixed wing aircraft, post engagement instructions may be sent to the multirotor lifter and/or the fixed wing aircraft. Post engagement instructions may include, for example, instructions for the multirotor lifter to replace and/or add one more power modules to the fixed wing aircraft, attach and/or detach a payload to the fixed wing aircraft, descend in a substantially vertical direction with the fixed wing aircraft, ascend in a substantially vertical direction with the fixed wing aircraft, release the fixed wing aircraft, etc. The post engagement instructions may be performed while both the multirotor lifter and the fixed wing aircraft are engaged and airborne. Likewise, multiple post engagement instructions may be provided and performed. For example, a series of post engagement instructions may be sent that instruct the multirotor lifter to add a payload to the fixed wing aircraft, replace a power supply of the fixed wing aircraft, ascend to a determined destination with the fixed wing aircraft, and then release the fixed wing aircraft. As will be appreciated, release of the fixed wing aircraft may follow the example process 700 (FIG. 7). After sending the post engagement instructions, the example process 800 completes, as in 818.

Figure 9:
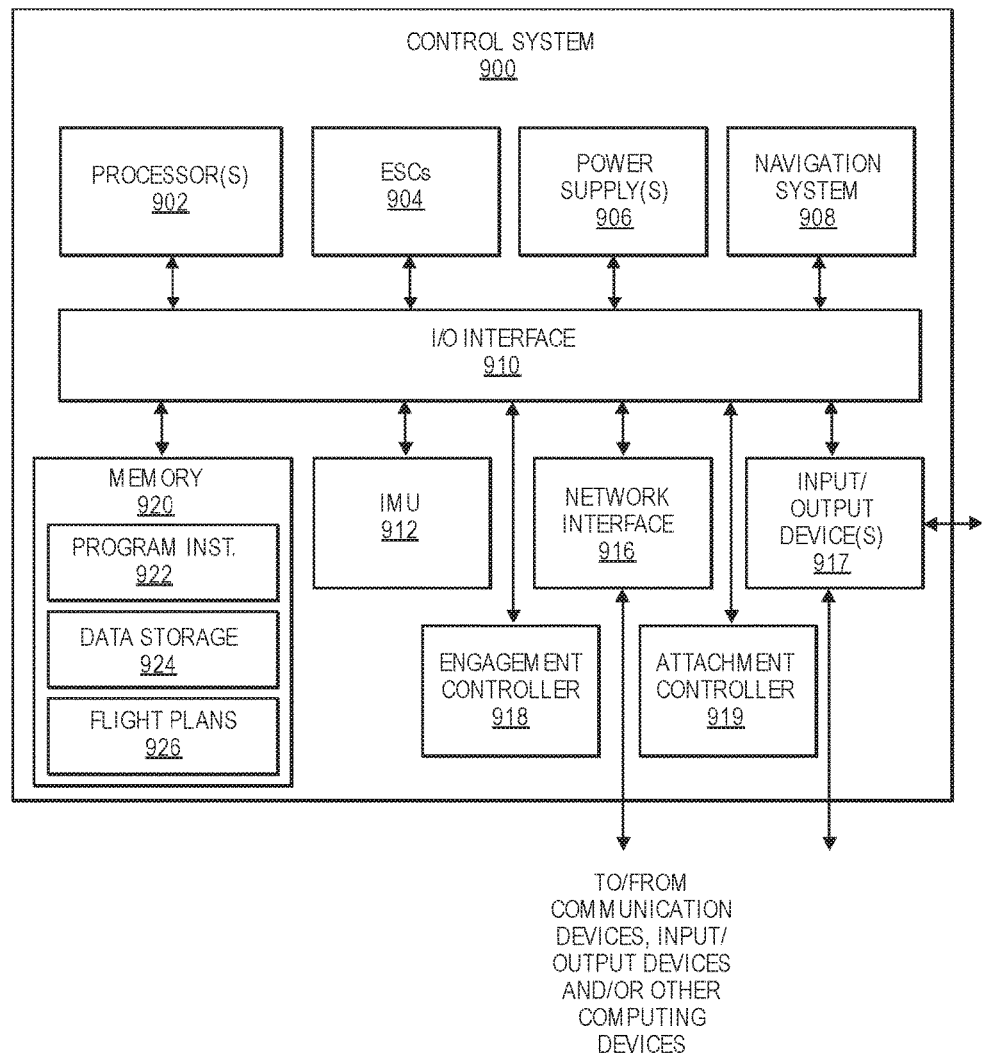
FIG. 9 is a block diagram of an illustrative implementation of an unmanned aerial vehicle control system that may be used with various implementations.

FIG. 9 is a block diagram illustrating an example control system 900. In various examples, the block diagram may be illustrative of one or more aspects of the control system 900 that may be used to implement the various systems and methods discussed herein and/or to control operation of the multirotor lifters and/or fixed wing aircrafts described herein. In the illustrated implementation, the control system 900 includes one or more processors 902, coupled to a memory, e.g., a non-transitory computer readable storage medium 920, via an input/output (I/O) interface 910. The control system 900 may also include electronic speed controls 904 (ESCs), power supply modules 906, a navigation system 908, and/or an inertial measurement unit (IMU) 912. In some implementations, the IMU may be incorporated into the navigation system 908. The control system 900 may also include a network interface 916, and one or more input/output devices 917.

If the control system is utilized in a multirotor lifter, the control system 900 may also include an engagement controller 918 and an attachment controller 919. The engagement controller may be configured to control the operation and timing of the engagement mechanism so that the multirotor lifter can selectively engage and/or disengage fixed wing aircrafts. For example, the engagement controller 918 may communicate with the actuator(s), motor(s), arm(s), drive mechanism(s), etc. of the engagement mechanism used to engage and/or disengage fixed wing aircrafts. Likewise, the attachment controller may be configured to control the operation of the attachment mechanism of the multirotor that is used to attach and/or detach payloads from the fixed wing aircraft, and/or attach/detach power supplies from the fixed wing aircraft. For example, the attachment controller 919 communicates with the actuator(s), motor(s), arm(s), drive mechanism(s), etc. of the attachment mechanism of the multirotor lifter to attached and/or detach payloads, power supplies, etc. to or from an engaged fixed wing aircraft.

In various implementations, the control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight plans, flight control parameters, component adjustment information, center of gravity information, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and flight plans 926, respectively. In other implementations, program instructions, data, and/or flight plans may be received, sent, or stored upon different types of computer-accessible media, such as non-transitory media, or on similar media separate from the non-transitory computer readable storage medium 920 or the control system 900. Generally speaking, a non-transitory, computer readable storage medium may include storage media or memory media such as magnetic or optical media, e.g., disk, coupled to the control system 900 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 917. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The ESCs 904 communicate with the navigation system 908 and/or the IMU 912 and adjust the rotational speed of each lifting motor (on multirotor lifters) and/or thrusting motor (on fixed wing aircrafts) to stabilize the aircraft and guide the aircraft along a determined flight path. The navigation system 907 may include a GPS, indoor positioning system (IPS), IMU or other similar system and/or sensors that can be used to navigate the aircraft.

The network interface 916 may be configured to allow data to be exchanged between the control system 900, other devices attached to a network, such as other computer systems (e.g., remote computing resources), and/or with control systems of other aircrafts. For example, the network interface 916 may enable wireless communication between a multirotor lifter and a fixed wing aircraft. For wireless communication, an antenna of an UAV or other communication components may be utilized. As another example, the network interface 916 may enable wireless communication between the aircraft and one or more remote computing resources. In various implementations, the network interface 916 may support communication via wireless general data networks, such as a Wi-Fi network. For example, the network interface 916 may support communication via telecommunications networks, such as cellular communication networks, satellite networks, and the like.

Input/output devices 917 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 917 may be present and controlled by the control system 900. One or more of these sensors may be utilized to assist in landing as well as to avoid obstacles during flight.

As shown in FIG. 9, the memory may include program instructions 922, which may be configured to implement the example routines and/or sub-routines described herein. The data storage 924 may include various data stores for maintaining data items that may be provided for determining flight paths, landing, identifying locations for disengaging items, engaging/disengaging aircrafts, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the control system 900 is merely illustrative and is not intended to limit the scope of the present disclosure. In particular, the computing system and devices may include any combination of hardware or software that can perform the indicated functions. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated control system 900. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the control system 900 may be transmitted to the control system 900 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system, comprising:
   an unmanned fixed wing aircraft, including:
      a fixed wing;
      a thrusting motor and corresponding thrusting propeller;
      a payload; and
      an engagement receiver to receive an engagement mechanism of an unmanned multirotor aircraft;
   the unmanned multirotor aircraft, including:
      a plurality of motors and corresponding propellers;
      the engagement mechanism configured to selectively engage or disengage the engagement receiver of the unmanned fixed wing aircraft; and
      a communication component to wirelessly communicate with the unmanned fixed wing aircraft; and
   a computing system, including:
      a processor; and
      a memory coupled to the processor and storing program instructions that when executed by the processor cause the processor to at least:
         determine that the unmanned fixed wing aircraft and the unmanned multirotor aircraft have reached an engagement location;
         send an engagement authorization;
         confirm that the unmanned multirotor aircraft has engaged the engagement mechanism with the engagement receiver of the unmanned fixed wing aircraft; and send a post engagement instruction to at least one of the unmanned multirotor aircraft or the unmanned fixed wing aircraft.

2. The system of claim 1, wherein the program instructions when executed by the processor further cause the processor to at least:
monitor a flight plan of the unmanned fixed wing aircraft prior to the unmanned fixed wing aircraft reaching the engagement location.

3. The system of claim 1, wherein information associated with the engagement location may include at least one of an airspace, a heading, a ground speed, an air speed, an altitude, or a flight path.

4. The system of claim 1, wherein the program instructions when executed by the processor further cause the processor to at least:
responsive to the unmanned multirotor aircraft being engaged to the unmanned fixed wing aircraft, cause the unmanned fixed wing aircraft to power down the thrusting motor and corresponding thrusting propeller.

5. The system of claim 1, wherein the post engagement instruction includes at least one of: an instruction to at least one of remove, replace, or add a power module to the unmanned fixed wing aircraft, an instruction to detach the payload from the unmanned fixed wing aircraft, an instruction to attach a second payload to the unmanned fixed wing aircraft, an instruction to change at least one of a heading, an altitude, or a speed of the unmanned fixed wing aircraft, or an instruction to disengage the engagement mechanism from the engagement receiver of the unmanned fixed wing aircraft.

6. A multirotor aircraft to selectively engage or disengage a fixed wing aircraft, the multirotor aircraft comprising:
a plurality of propulsion components to aerially maneuver the multirotor aircraft and at least a portion of the fixed wing aircraft;
an engagement mechanism to engage or disengage the fixed wing aircraft; and
a control system configured to at least:
cause the multirotor aircraft to maneuver to an engagement location associated with the fixed wing aircraft; and
engage, using the engagement mechanism, the fixed wing aircraft at the engagement location.

7. The multirotor aircraft of claim 6, wherein the control system is further configured to at least:
monitor a flight plan of the fixed wing aircraft; and
determine the engagement location associated with the fixed wing aircraft based at least in part on the flight plan.

8. The multirotor aircraft of claim 6, wherein information associated with the engagement location may include at least one of an airspace, a heading, a ground speed, an air speed, an altitude, or a flight path.

9. The multirotor aircraft of claim 6, further comprising a second multirotor aircraft that engages the fixed wing aircraft to aerially maneuver at least a second portion of the fixed wing aircraft.

10. The multirotor aircraft of claim 6, further comprising:
a tether coupled between the multirotor aircraft and a ground station, the tether providing at least one of power or communication to the multirotor aircraft.

11. The multirotor aircraft of claim 6, wherein the engagement mechanism comprises at least one of an electromagnet, a permanent magnet, or a mechanical engagement mechanism movable from a first disengaged position to a second engaged position.

12. The multirotor aircraft of claim 6, wherein the control system is further configured to at least:
identify the fixed wing aircraft at the engagement location based at least in part on at least one of a visually unique identifier on the fixed wing aircraft or an identifier transmitted by the fixed wing aircraft.

13. The multirotor aircraft of claim 6, further comprising:
an attachment mechanism; and
wherein the control system is further configured to at least:
cause, responsive to the multirotor aircraft and the fixed wing aircraft being engaged, the attachment mechanism to at least one of: attach at least one of a payload or a power module to the fixed wing aircraft, or detach at least one of a payload or a power module from the fixed wing aircraft.

14. The multirotor aircraft of claim 6, wherein the control system is further configured to at least one of:
modify, responsive to the multirotor aircraft and the fixed wing aircraft being engaged, at least one of a heading, an altitude, or a speed of the fixed wing aircraft; or
cause the engagement mechanism to disengage the fixed wing aircraft such that the fixed wing aircraft can initiate a flight path.

15. A method, comprising:
determining an engagement location associated with a fixed wing aircraft;
causing navigation of a multirotor aircraft to the engagement location; and
causing engagement, at the engagement location, between the multirotor aircraft and the fixed wing aircraft.

16. The method of claim 15, wherein determining the engagement location associated with the fixed wing aircraft includes receiving from the fixed wing aircraft at least one of a heading, an altitude, an air speed, a ground speed, or a flight path.

17. The method of claim 15, further comprising:
sending, prior to the causing engagement, position instructions that indicate at least one of a heading, an altitude, an air speed, or a ground speed that is to be maintained by at least one of the multirotor aircraft or the fixed wing aircraft.

18. The method of claim 15, further comprising:
identifying, prior to the causing engagement, at least one of the multirotor aircraft or the fixed wing aircraft at the engagement location.

19. The method of claim 18, further comprising:
receiving, subsequent to the identifying and prior to the causing engagement, from a remote computing resource an engagement authorization indicating that the multirotor aircraft is authorized to engage with the fixed wing aircraft.

20. The method of claim 15, further comprising:
causing transfer, responsive to the multirotor aircraft and the fixed wing aircraft being engaged, of at least one of a payload or a power supply between the multirotor aircraft and the fixed wing aircraft.

21. The method of claim 15, further comprising:
causing modification, by the multirotor aircraft and responsive to the multirotor aircraft and the fixed wing aircraft being engaged, to at least one of a heading, an altitude, or a speed of the fixed wing aircraft; and
causing disengagement of the fixed wing aircraft from the multirotor aircraft such that the fixed wing aircraft can initiate a flight path based at least in part on the modified at least one of the heading, the altitude, or the speed.

* * * * *